(12) United States Patent
Bøllingtoft

(10) Patent No.: US 10,252,661 B2
(45) Date of Patent: Apr. 9, 2019

(54) LOAD-STRAPPING DEVICE

(71) Applicant: ERGOLASH PAT. APS, Odense SV (DK)

(72) Inventor: Jackie Bøllingtoft, Odense C (DK)

(73) Assignee: Ergolash Pat. APS, Odense SV (DK)

( * ) Notice: Subject to any disclaimer, the term of this patent is extended or adjusted under 35 U.S.C. 154(b) by 0 days.

(21) Appl. No.: 15/557,045

(22) PCT Filed: Mar. 9, 2016

(86) PCT No.: PCT/DK2016/050066
§ 371 (c)(1),
(2) Date: Sep. 8, 2017

(87) PCT Pub. No.: WO2016/141944
PCT Pub. Date: Sep. 15, 2016

(65) Prior Publication Data
US 2018/0111541 A1    Apr. 26, 2018

(30) Foreign Application Priority Data

Mar. 10, 2015 (DK) ................................. 2015 70133
Mar. 18, 2015 (DK) ................................. 2015 70153

(51) Int. Cl.
*B60P 7/08* (2006.01)
(52) U.S. Cl.
CPC .................................... *B60P 7/083* (2013.01)
(58) Field of Classification Search
CPC .......... B60P 7/083; B60P 7/0846; B66D 1/30; B66D 1/34; B66D 1/36
See application file for complete search history.

(56) References Cited

U.S. PATENT DOCUMENTS 482,035 A * 9/1892 Buckingham ........ B65H 54/585
    254/223
4,007,887 A * 2/1977 Vice ........................ B60P 7/083
    242/532.6
(Continued)

FOREIGN PATENT DOCUMENTS

DE    202011002834U U1    7/2011
EP    0589392 A1    1/1994
(Continued)

OTHER PUBLICATIONS

Danish Patent and Trademark Office, Search Report for Application PA201570133, dated Dec. 18, 2015.
(Continued)

*Primary Examiner* — Emmanuel M Marcelo
(74) *Attorney, Agent, or Firm* — Ice Miller LLP

(57) ABSTRACT

A load-strapping device including at least two frame parts connected by a pivotable joint, where one frame part is attacked to a strap, where the joint between the pivotable parts is provided with a spindle extending between parallel flanges of the frame parts, the pivotable joint between the pivotable parts provided at opposite ends of the spindle with a pawl-and-ratchet mechanism which provides one-way rotation of the spindle when the pivotable basic parts are pivoted repeatedly in opposing directions, characterized in that the spindle is provided with two recesses arranged at respective different oblique angles relative to the rotation axis of the spindle and that the recesses are mutually spaced, and in opposite orientations.

9 Claims, 7 Drawing Sheets

(56) References Cited

U.S. PATENT DOCUMENTS

| | | | | |
|---|---|---|---|---|
| 4,604,773 | A * | 8/1986 | Weber | B60N 2/2821 |
| | | | | 24/269 |
| 5,271,606 | A * | 12/1993 | Kamper | B60P 7/083 |
| | | | | 254/217 |
| 6,105,211 | A * | 8/2000 | Berger | A44B 11/125 |
| | | | | 24/68 CD |
| 6,279,847 | B1 * | 8/2001 | Berger | A44B 11/125 |
| | | | | 24/68 CD |
| 6,499,723 | B1 * | 12/2002 | McNarry | B60P 7/083 |
| | | | | 24/68 CD |
| 6,539,590 | B2 * | 4/2003 | Ziv | B60N 2/2806 |
| | | | | 24/269 |
| 7,877,846 | B1 * | 2/2011 | Chen | B60P 7/0846 |
| | | | | 24/68 CD |
| 8,209,821 | B1 * | 7/2012 | Chen | B60P 7/083 |
| | | | | 24/265 CD |
| 2014/0298629 | A1 * | 10/2014 | Hansen | B60P 7/083 |
| | | | | 24/68 CD |

FOREIGN PATENT DOCUMENTS

| | | | |
|---|---|---|---|
| WO | 2007113373 | A1 | 10/2007 |
| WO | 2011064567 | A1 | 6/2011 |
| WO | 2012095551 | A1 | 7/2012 |

OTHER PUBLICATIONS

Danish Patent and Trademark Office, Search Report for Application PA201570153, dated Sep. 17, 2015.
European Patent Office, International Search Report for Application PCT/DK2016/050066, dated Jun. 29, 2016.

* cited by examiner

LOAD-STRAPPING DEVICE

CROSS REFERENCE TO RELATED APPLICATION

The present application is a U.S. national stage of, and claims the priority benefit of, International Patent Application Serial No. PCT/DK2016/050066, filed Mar. 9, 2016 and also claims the priority benefit of Danish Patent Application Serial No. PA201570133, filed Mar. 10, 2015, and Danish Patent Application Serial No. PA201570153, filed Mar. 18, 2015, the text and drawings of which are hereby incorporated by reference in their entireties.

FIELD OF INVENTION

The invention concerns a load-strapping device of the kind used for securing load to a vehicle, particularly trailers and lorries. The device is provided for joining and tensioning straps holding the load onto a platform or other load-carrying base.

BACKGROUND OF THE INVENTION

Prior art load-strapping devices are provided with a spindle extending between flanges of mutually pivoting frame parts of the device. A free end of a strap is passed through a slot in the spindle, and by a pawl-and-ratchet mechanism provided at the joint, the spindle is rotated in one direction, thus winding the strap around itself when the frame parts are repeatedly pivoted in opposite directions. Releasing the strap occurs by releasing the ratchet wheel by pulling two arresting pawls, one in each frame parts, against spring bias, allowing the spindle to rotate backwards and unwind the strap. After that, the free end of the strap can be pulled out from the slot. This prior art entails some tedious work with handling the sometimes long, free end of the strap and pulling it through the slot before tightening, and the reverse action of unwinding the strap end and finally pulling it out again. For a large load needing a plurality of straps, these actions have to be repeated many times.

US 2008/0244883 A1 discloses a strapping device where the spindle itself is a two-part design. A first part of the spindle can be moved relatively to a second part of the spindle in order to engage and/or release a strap between the parts of the spindle. The movement between the spindle parts for engaging and releasing the strap is lateral such that one spindle part is slid in parallel with the other part of the spindle, thus exposing a space where the strap is to be located. Thereby it is possible to place the strap in the exposed space without having to use and pull the end of the strap through a slot in the spindle. The slot is established after positioning the strap by sliding the other part of the spindle back into operating or closed position. Releasing the strap after unwinding is provided by reversing the movement of the movable part of the spindle. A similar design is disclosed in WO 2007/113373 and WO2012/095551.

WO 2006/001714 discloses a strapping device with a bifurcated spindle. In one embodiment, the spindle is provided with two parallel arms joined by a bend. In the mounted condition, the parallel arms form a slot in the spindle. The spindle can be inserted and pulled out laterally in the joint between the movable parts. In this way, the strap can be fitted and removed without taking the free end of the strap and pull it through the slot. Releasing can be done by drawing the spindle laterally, thus allowing the windings of the strap to slide off the spindle.

The prior art presented in the cited documents all entail manipulation of a part of the spindle for engaging and disengaging the strap. In outdoor conditions operation may be impeded when using gloves for protection, slippery surfaces due to rain or ice, and dirt on the strap, especially when disengaging and releasing the strap from the strapping device.

EXPLANATION OF THE INVENTION

In a preferred embodiment the invention provides a load-strapping device including at least two frame parts connected by a pivotable joint, where one frame part is attached to a strap, where the joint between the pivotable parts is provided with a spindle extending between parallel flanges of the frame parts, the pivotable joint between the pivotable parts provided at opposite ends of the spindle with a pawl-and-ratchet mechanism which provides one-way rotation of the spindle when the pivotable basic parts are pivoted repeatedly in opposing directions, wherein the spindle is provided with at least one recess cut into the body of the spindle, where said at least one recess is adapted to receive a strap.

In a further advantageous embodiment of the invention the spindle is provided with two recesses arranged at respective different oblique angles relative to the rotation axis of the spindle and that the recesses are mutually spaced, and in opposite orientations.

In these embodiments there are no moving parts needed in order to retain the strap in fixed relationship to the spindle. In this connection fixed relationship shall be understood such that as the spindle is rotated, the strap will not be able to lead the spindle, but will be wound around the spindle. The very simple feature providing recesses in the spindle into which a strap is supposed to be inserted creates a simple and maintenance free and extremely reliable fixture which is easy to use and which does not require any special tools or handling in operation. Naturally the strap must be sufficiently pliable in order to be able to insert the strap into the recesses, but for relatively stiff straps which are also wide, the spindle will be longer thereby making it possible to have a greater distance between the recesses such that the strap as such does not need to be bent or deformed very must in order to be inserted into the recesses.

In a still further advantageous embodiment of the invention the recesses are cut-outs arranged symmetrically at a predefined distance about the centre of the spindle, where the opening of the recesses are closer to the centre than the bottoms of the recesses.

Cut-outs may easily be provided by appropriate machinery and by maintaining a predetermined distance and having cut-outs with dimensions, for example 150% of the thickness of the strap for which the recesses are intended to receive, placement of the straps in the recesses becomes very easy as well as manufacturing of the spindle becomes relatively cheap.

Naturally the spindle may be manufactured in oversize in order to accommodate the recesses, but typically the material characteristics of the steel from which the spindles are manufactured are sufficient, such that the recesses will not weaken the construction to such a point that the spindle becomes the weak point in the construction.

The recesses are arranged such that they flare away from each other, i.e. such that the openings of the recesses are closer to each other than the bottoms of the recesses whereby by bending a strap the two side edges of the strap will be able to be fitted inside the recesses in the spindle. The mutual distance between the recesses and particularly the openings of the recesses will be provided according to the width and applicability of the strap for which the load strapping device is designed.

In a still further advantageous embodiment of the invention recesses are connected to an enlarged cut-out section, said enlarged cut-out section spanning the diameter of the spindle, and has an extend in the spindles longitudinal direction along the rotation axis, at least intersecting both recesses.

The enlarge cut-out section is designed to accommodate the strap, such that the recesses will allow the strap into the enlarged cut-out section. Once the strap is in the enlarged cut-out section, the strap's side edges will spread out in the enlarged cut-out section, avoiding the strap being bent. Thereby when winding the strap up on the spindle, the strap will be smoother, allowing for easier winding/unwinding, and at the same time allow more windings as these are completely flat.

A guide element may be provided on or as part of the spindle, where the guide element is adapted to guide the strap inserted through the recess. Hereby a secure winding of the strap is ensured.

The invention is also directed to a method of using a device according to the invention comprising the following method, wherein a device having a spindle corresponding in width to the strap which is to be strapped is selected, and where the strap is arranged flatly over the spindle, after which the side edges of the strap is inserted in respective recesses provided in the spindle, after which the ratchet mechanism is activated in order to wind the strap around the spindle, thereby tightening the strap.

THE DRAWING

Exemplary embodiments of the invention are now described with reference to the drawing, in which.

Figure 7A:
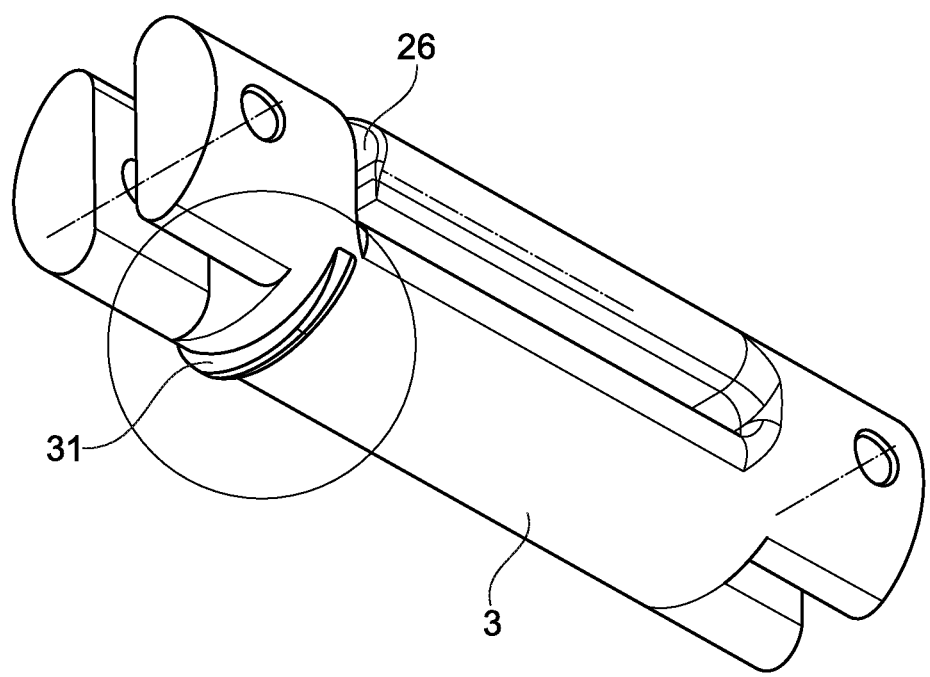

FIG. 7A,B show an example where a guide element has been provided for guiding the strap.

DESCRIPTION OF EXAMPLE EMBODIMENTS

The strapping device according to the invention comprises several parts in common with prior art devices for tightening and securing straps or belts on loads to be transported or be held firm together or to a base.

The invention shown in the drawings include two mutually pivoting frame parts 1, 2 that are hingedly connected at a spindle generally designated by the number 3. One frame part 1 is provided with a handle 4 for use in the tightening operation, and the other frame part 2 is provided with a bolt 5 or rod member for securing the end of a not shown strap.

The spindle 3 extends between and through opposing and parallel flanges 7 and 8 of the frame parts 1 and 2, respectively. Similar to the prior art, the device according to the invention is provided with a pawl-and-ratchet mechanism for providing a one-way rotation of the spindle 3 when the parts 1 and 2 are pivoted in opposite directions. The main features of this mechanism is a pair of ratchet wheels 9 which are fixed to the spindle 3 between the flanges 7, 8, but rotatably seated in relation to the parts 1 and 2, and two spring-biased pawls 10, 11 provided in respective frame parts 1, 2. The sliding pawls 10, 11 can be released from engagement with the ratchet wheels 9 by manually pulling the pawls 10, 11 back against the action of not shown springs.

Figure 1:
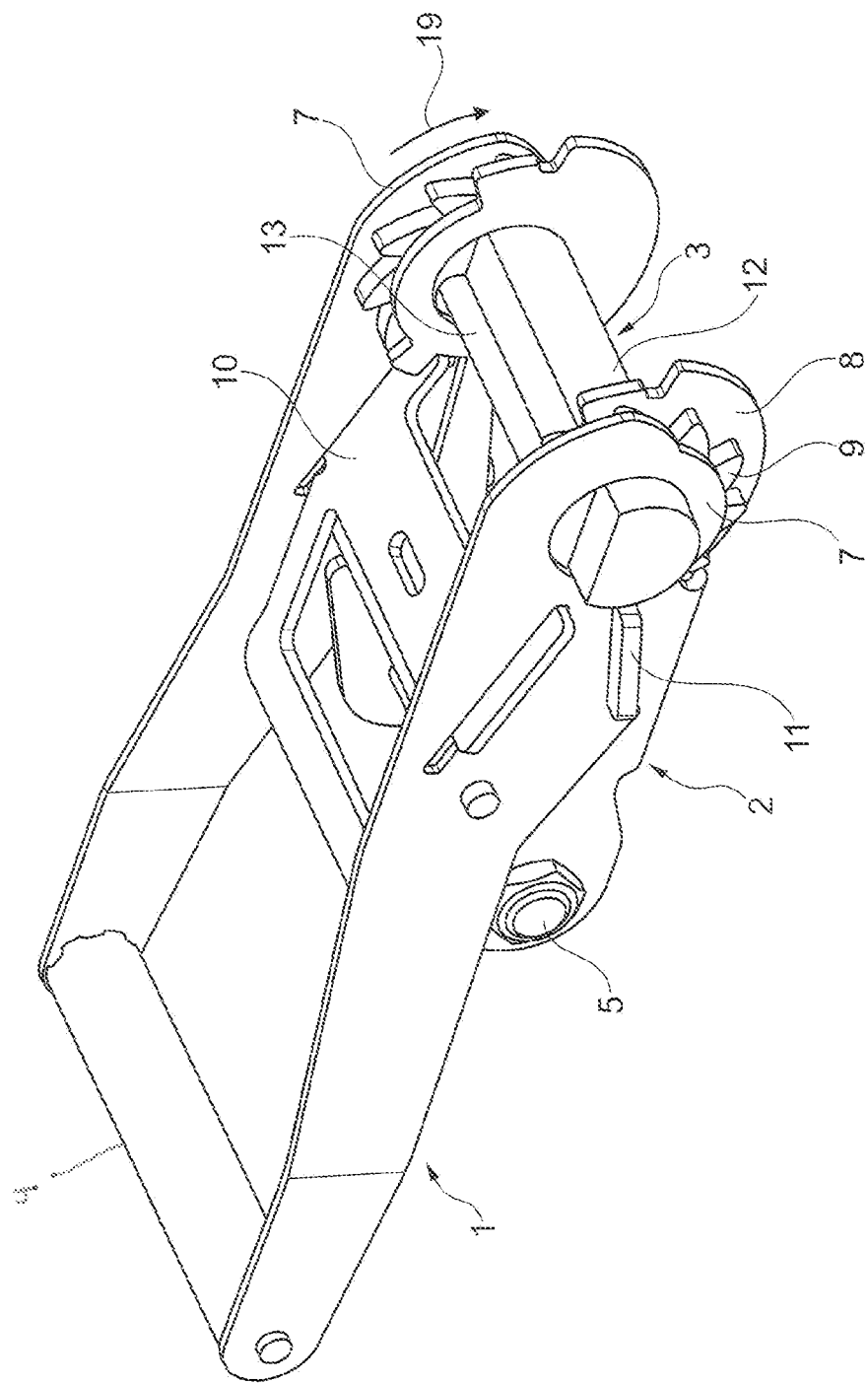
FIG. 1 shows a perspective view of a prior art embodiment of a load strapping device.
Figure 2:
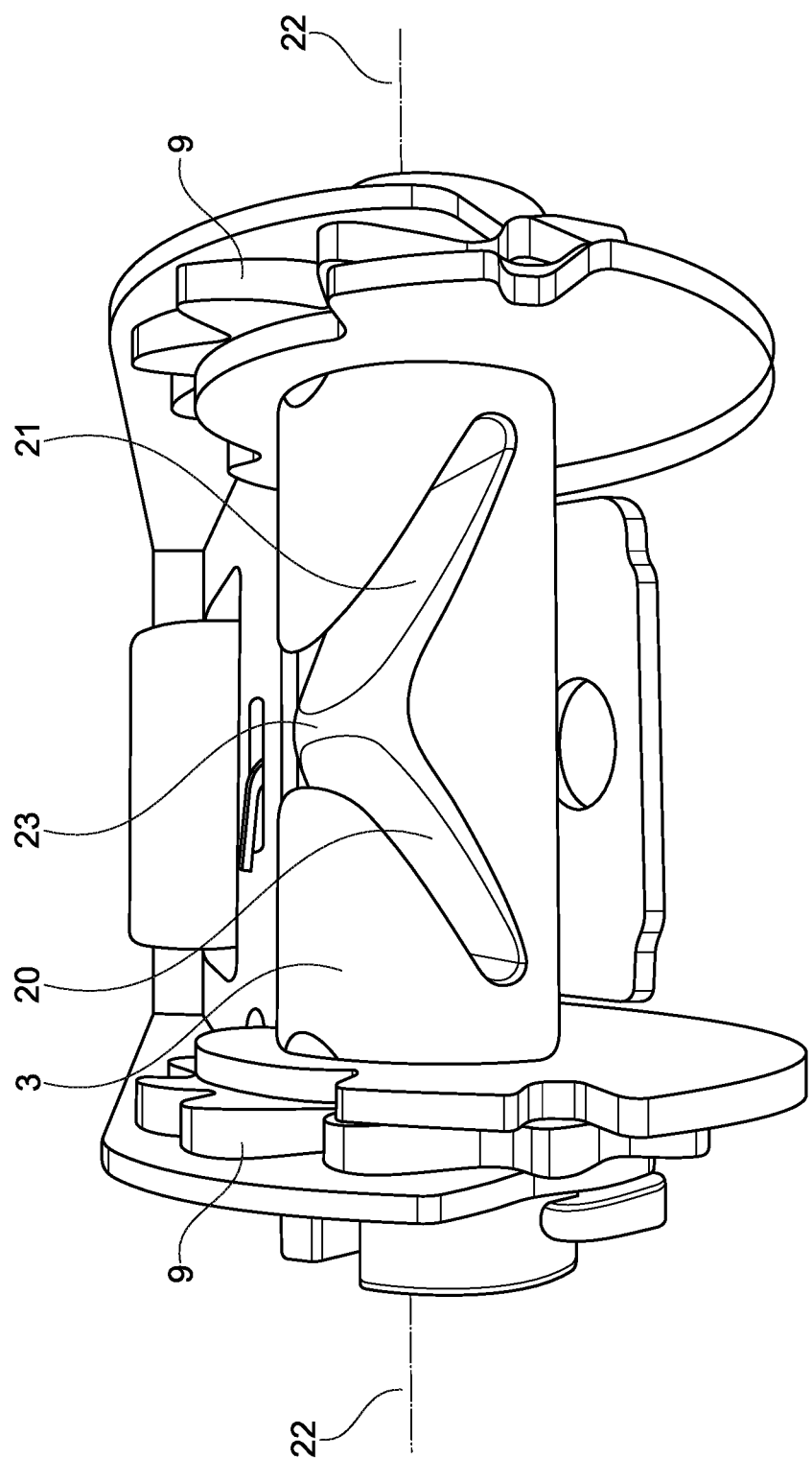
FIG. 2 shows an embodiment of the invention without a strap mounted in the spindle.

In FIG. 2 is illustrated an embodiment of the spindle 3 according to the invention. The spindle is provided with two recesses 20, 21 arranged at different oblique angles relative to the axis of rotation illustrated by the dashed line 22. The recesses 20, 21 are mutually spaced in this embodiment such that the upper part of the recesses illustrated by reference number 23 intersect and thereby make it relatively easy to insert the strap. In this embodiment the recesses 20, 21 are created by cut-outs in the spindle 3. The ends of the spindle are completely comparable to the prior art devices and as such are able to accommodate the frames and flanges 7, 8 as well as the pair of ratchet wheels 9.

Figure 3:
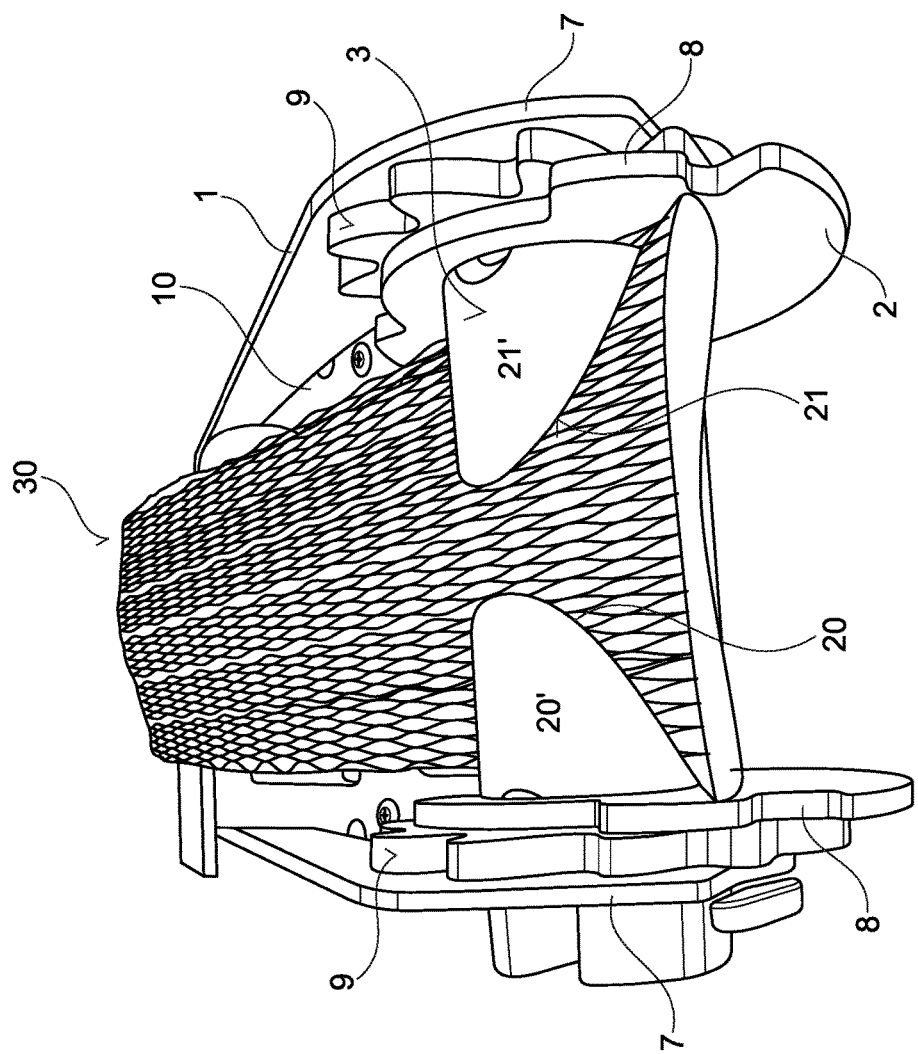
FIG. 3 shows an embodiment of the invention with a strap mounted in the spindle.

Turning to FIG. 3 a strap 30 has been folded into the recesses 20, 21 such that by rotating the spindle 3 the upper part of the spindles 21', 20' will hold the strap 30 in place in the spindle such that by rotation the strap will be wound around the spindle 3.

Figure 4:
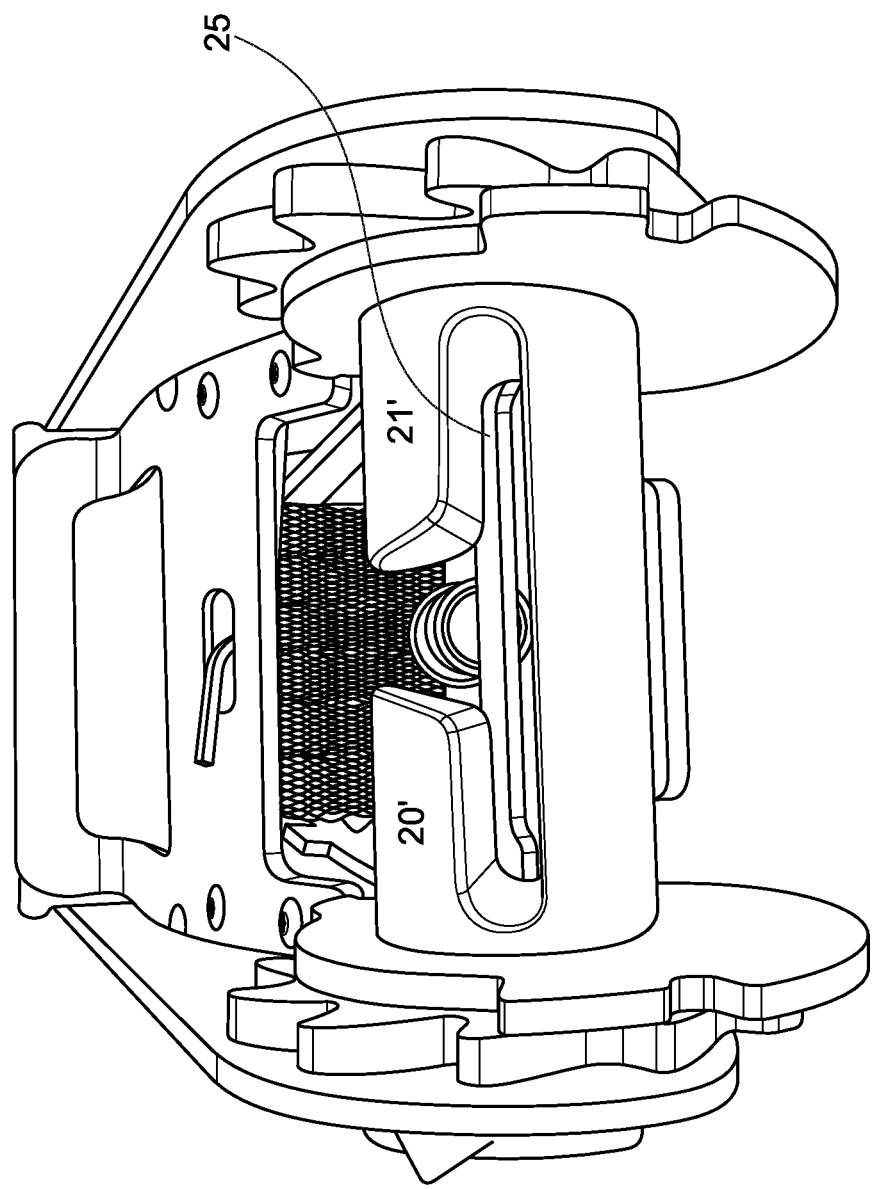
FIG. 4 shows a further embodiment of the invention.

In FIG. 4 is illustrated a further embodiment of the invention. The spindle 3 is provided with an enlarged cut-out section 25. The enlarged cut-out section 25 span the diameter of the spindle, i.e. there is a slit going through the spindle 3. The extent of the enlarged cut-out section 25 in the spindle's 3 longitudinal direction (along the rotation axis 22), at least intersects both recesses. Due to the nature of the construction when cutting/forming the recesses, a central piece will be cut loose, such that the recesses will only have one side. The upper parts of the recesses 20', 21' will still retain the strap as explained above with reference to FIG. 3.

Figure 5:
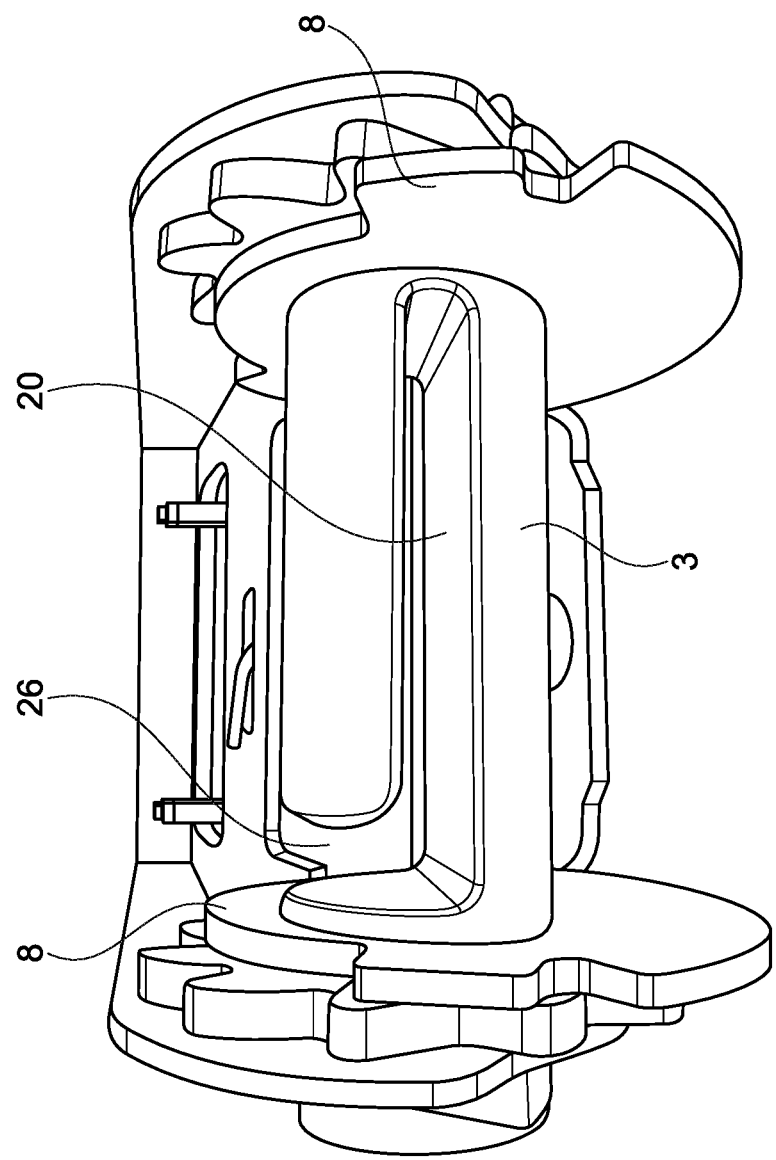
FIG. 5 shows a further embodiment of the invention.
Figure 6:
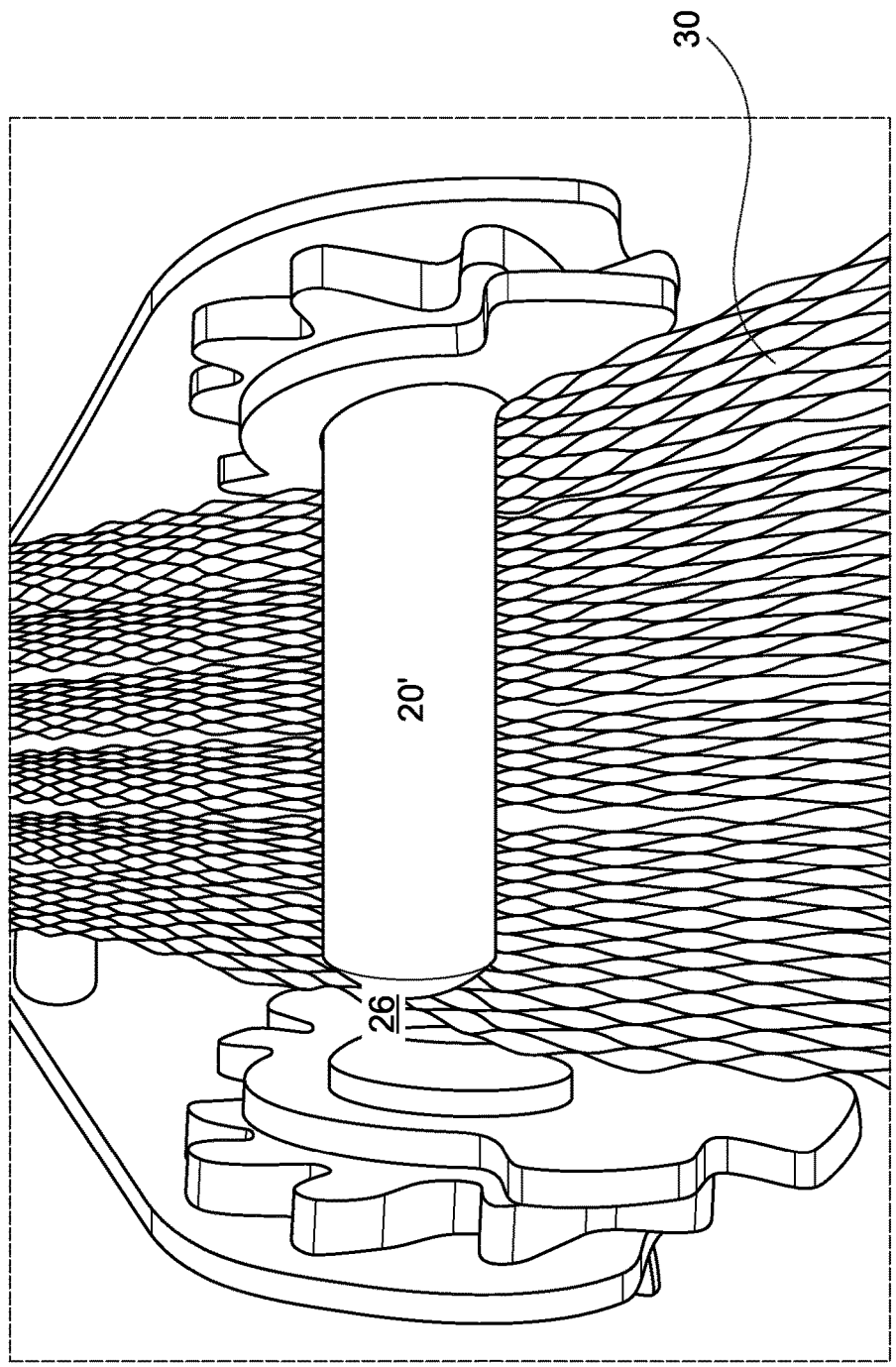
FIG. 6 shows the embodiment of FIG. 5 with a strap mounted in the spindle.

In FIGS. 5 and 6 is illustrated a preferred embodiment of the invention. The mechanism activating and causing the rotation of the spindle 3 is the same as for all the embodiments described above. In this embodiment the spindle 3 is provided with a long recess 20 which spans almost the entire distance between the parallel flanges 8. Adjacent one flange 8 is provided a cut-out 26, being an integral part of the recess 20. The cut-out allows for a strap 30—see FIG. 6, to be inserted by its side edge in the cut-out 26, and slid into the recess 20, such that when the spindle 3 is rotated the upper portion 20' of the spindle will retain the strap 30, causing the strap 30 to be wound around the spindle 3.

Figure 7B:
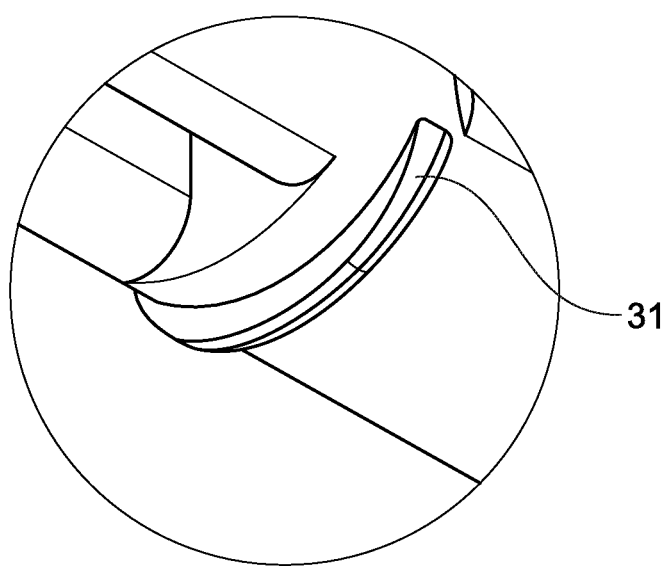

In FIGS. 7A and 7B a further embodiment is shown where a guide element is provided on or as part of the spindle, the guide element being adapted to guide the strap inserted through the recess. A further guide element may be provided at a distance from the first guide element.

The invention claimed is:

1. A load-strapping device including at least two frame parts, each frame part having parallel flanges, and where said frame parts are connected by a pivotable joint, where one frame part is attached to a strap, where the pivotable joint between the pivotable parts is provided with a spindle extending between parallel flanges of the frame parts, said spindle having a spindle body, being able to rotate around a rotation axis, the pivotable joint between the pivotable parts provided at opposite ends of the spindle with a pawl-and-ratchet mechanism which provides one-way rotation of the spindle when the pivotable frame parts are pivoted repeatedly in opposing directions, wherein the spindle is provided with at least one recess cut into the body of the spindle, where the recesses extend less than half the spindle's diameter into the spindle, where said at least one recess is adapted to receive the strap.

2. A load-strapping device according to claim 1, wherein the recess has an extend in the direction of the spindles rotation axis of more than 50%, of the distance between the parallel flanges.

3. A load-strapping device according to claim 1 wherein two recesses are arranged at respective different oblique angles relative to the rotation axis of the spindle and that the recesses are mutually spaced, and in opposite orientations.

4. Device according to claim 3, wherein the recesses are cut-outs arranged symmetrically a predefined distance about the centre of a length the spindle, where an opening of the recesses is closer to the centre than a bottom of the recesses.

5. Device according to claim 3, wherein the recesses are connected to an enlarged cut-out section, said enlarged cut-out section spanning the diameter of the spindle, and has an extend in the spindle's longitudinal direction along the rotation axis, at least intersecting both recesses.

6. Device according to claim 1, wherein a guide element is provided on or as part of the spindle, the guide element being adapted to guide the strap inserted through the recess.

7. A load-strapping device according to claim 1, wherein the recess has an extend in the direction of the spindles rotation axis of more than 75% of the distance between the parallel flanges.

8. A load-strapping device according to claim 1, wherein the recess has an extend in the direction of the spindles rotation axis of more than 90% of the distance between the parallel flanges.

9. Method of using a load strapping device said load strapping device including at least two frame parts, each frame part having parallel flanges, and where said frame parts are connected by a pivotable joint, where one frame part is attached to a strap, where the pivotable joint between the pivotable parts is provided with a spindle extending between parallel flanges of the frame parts, said spindle having a spindle body, being able to rotate around a rotation axis, the pivotable joint between the pivotable parts provided at opposite ends of the spindle with a pawl-and-ratchet mechanism which provides one-way rotation of the spindle when the pivotable frame parts are pivoted repeatedly in opposing directions, wherein the spindle is provided with at least one recess cut into the body of the spindle, where said at least one recess is adapted to receive the strap, at the spindle corresponding in width at least to the strap which is to be strapped is selected, and where the strap is arranged flatly over the spindle, after which one or both side edges of the strap is inserted in respective recesses provided in the spindle, wherein the recesses extend less than half the spindle's diameter into the spindle, after which the pawl-and-ratchet mechanism is activated in order to wind the strap around the spindle, thereby tightening the strap.

* * * * *